(12) United States Patent
Kweeder

(10) Patent No.: US 7,785,387 B2
(45) Date of Patent: Aug. 31, 2010

(54) CHEMICALLY AND PHYSICALLY MODIFIED FERTILIZERS, METHODS OF PRODUCTION AND USES THEREOF

(75) Inventor: James A. Kweeder, Chester, VA (US)

(73) Assignee: Honeywell International Inc., Morristown, NJ (US)

( * ) Notice: Subject to any disclaimer, the term of this patent is extended or adjusted under 35 U.S.C. 154(b) by 228 days.

(21) Appl. No.: 11/933,545

(22) Filed: Nov. 1, 2007

(65) Prior Publication Data

US 2009/0113966 A1    May 7, 2009

(51) Int. Cl.
*C05C 9/00* (2006.01)
(52) U.S. Cl. .............................................. 71/28; 71/29
(58) Field of Classification Search ...................... 71/28, 71/29
See application file for complete search history.

(56) References Cited

U.S. PATENT DOCUMENTS

| | | | |
|---|---|---|---|
| 3,190,774 A | 6/1965 | Wilson | |
| 4,764,200 A | 8/1988 | Meiss et al. | |
| 4,842,790 A * | 6/1989 | Nunnelly | 264/117 |
| 5,654,033 A | 8/1997 | McNabb et al. | |
| 5,783,203 A | 7/1998 | Schutte et al. | |
| 6,677,399 B2 * | 1/2004 | Herbert et al. | 524/547 |
| 7,015,177 B2 * | 3/2006 | Knott et al. | 504/343 |
| 7,052,749 B2 | 5/2006 | Kapusniak et al. | |
| 7,070,795 B1 * | 7/2006 | Botts et al. | 424/409 |
| 7,179,859 B2 * | 2/2007 | Kirby et al. | 524/566 |
| 2006/0044383 A1 | 3/2006 | Romano, Jr. | |

* cited by examiner

*Primary Examiner*—Timothy C Vanoy
*Assistant Examiner*—Michelle Hou

(57) ABSTRACT

Modified fertilizer materials are produced, comprising a) at least one fertilizer granule coated with a dispersant to form at least one fertilizer granule-dispersant particle, b) a dispersant, which comprises at least one agrochemical blended with at least one powder, and c) an overcoating material that is applied to the at least one fertilizer granule-dispersant particle. Methods of producing a modified fertilizer materials comprise: a) providing at least one fertilizer granule, b) providing a dispersant that comprises at least one agrochemical blended with at least one powder, c) providing an overcoating material, d) applying the dispersant to the at least one fertilizer granule to form at least one fertilizer granule-dispersant particle, and e) applying the overcoating material to the at least one fertilizer granule-dispersant particle to form the modified fertilizer material.

14 Claims, 1 Drawing Sheet

```
                                                    ┌ 100
┌─────────────────────────────────────┐
│ Providing at least one fertilizer    │~110
│ granule                              │
└─────────────────────────────────────┘
                  │
┌─────────────────────────────────────┐
│ Providing a dispersant that comprises│~120
│ at least one agrochemical blended    │
│ with at least one powder             │
└─────────────────────────────────────┘
                  │
┌─────────────────────────────────────┐
│ providing an overcoating material    │~130
└─────────────────────────────────────┘
                  │
┌─────────────────────────────────────┐
│ applying the dispersant to the       │
│ at least one fertilizer granule to form│~140
│ at least one fertilizer granule-dispersant│
│ particles                            │
└─────────────────────────────────────┘
                  │
┌─────────────────────────────────────┐
│ applying the overcoating material to │
│ the at least one fertilizer granule- │~150
│ dispersant particle to form the      │
│ modified fertilizer material.        │
└─────────────────────────────────────┘
```

CHEMICALLY AND PHYSICALLY MODIFIED FERTILIZERS, METHODS OF PRODUCTION AND USES THEREOF

FIELD OF THE SUBJECT MATTER

The field of the subject mater is chemically-modified and physically-modified fertilizers, their methods of production and uses thereof.

BACKGROUND

Conventional fertilizers are granulated from the constituent nutrients that are utilized to form the fertilizers. In some formulations, various crop chemicals or "agrochemicals" are added to the granulated mixtures in order to achieve additional goals in the plant products beyond fertilization. The fact that these conventional fertilizers were prepared by granulation meant that the agrochemicals could be granulated with the fertilizer constituents to give a finished product.

As new fertilizers began to be processed by methods other than granulation, it became more difficult to add agrochemicals to the fertilizers. Manufacturers coated the fertilizer particles with solutions that contained agrochemicals, but then found that many of the most desirable agrochemicals didn't dissolve in suitable solutions in order to coat the fertilizer particles.

It is common to apply liquid coatings to fertilizers to impart desirable properties or control undesirable properties. Dry ingredients can only be used to the extent that they are soluble in the base liquid or to the extent that a useful liquid-solid suspension or slurry can be made and applied. One approach is to apply the solid ingredient first to the fertilizer and then apply the liquid to seal the solid to the product. However, the solid ingredient is limited to those that have good spreading characteristics, but still adhere to the product to be ultimately held into place.

Therefore, there is a need to prepare physically and chemically modified fertilizers, which are modified through coating with desirable agrochemicals. It is also a goal to prepare these modified fertilizers by using any desirable agrochemicals despite the fact that those agrochemicals may not be dissolvable in liquids.

BRIEF DESCRIPTION OF THE FIGURE AND TABLE

FIG. 1 shows a contemplated method for producing modified fertilizer materials.

Table 1 shows some contemplated modified fertilizer material recipes.

SUMMARY OF THE SUBJECT MATTER

Modified fertilizer materials are produced, comprising: a) at least one fertilizer granule coated with a dispersant to form at least one fertilizer granule-dispersant particle, b) a dispersant, which comprises at least one agrochemical blended with at least one powder, and c) an overcoating material that is applied to the at least one fertilizer granule-dispersant particle.

Methods of producing a modified fertilizer materials comprise: a) providing at least one fertilizer granule, b) providing a dispersant that comprises at least one agrochemical blended with at least one powder, c) providing an overcoating material, d) applying the dispersant to the at least one fertilizer granule to form at least one fertilizer granule-dispersant particle, and e) applying the overcoating material to the at least one fertilizer granule-dispersant particle to form the modified fertilizer material.

DETAILED DESCRIPTION

Physically and chemically modified fertilizers, which are modified through coating with desirable agrochemicals, have advantageously been produced. These modified fertilizers are modified by using desirable and suitable agrochemicals, despite the fact that those agrochemicals may not be dissolvable in liquids.

Specifically, a modified fertilizer material is produced, comprising: a) at least one fertilizer granule coated with a dispersant to form at least one fertilizer granule-dispersant particle, b) a dispersant, which comprises at least one agrochemical blended with at least one powder, and c) an overcoating material that is applied to the at least one fertilizer granule-dispersant particle. A method of producing a modified fertilizer material comprises: a) providing at least one fertilizer granule, b) providing a dispersant that comprises at least one agrochemical blended with at least one powder, c) providing an overcoating material, d) applying the dispersant to the at least one fertilizer granule to form at least one fertilizer granule-dispersant particle, and e) applying the overcoating material to the at least one fertilizer granule-dispersant particle to form the modified fertilizer material.

Contemplated modified fertilizer materials begin with the at least one fertilizer granule. The at least one fertilizer granule comprises any suitable fertilizer granule that can be produced or sold in bulk and can additionally be coated with another material. In contemplated embodiments, the at least one fertilizer granule comprises nitrogen-based fertilizers, potassium-based fertilizers, phosphorus-based fertilizers or combinations thereof. In some embodiment, the at least one fertilizer granule comprises ammonium fertilizers, such as ammonium sulfate or urea, which benefits greatly from both nitrification and urease inhibitors.

The granule-dispersant particle is formed by coating the at least one fertilizer granule with at least one suitable agrochemical mixture or dispersant. This at least one suitable dispersant is formed by blending at least one agrochemical with another powder that results in a mixture with suitable properties to disperse and spread the agrochemical onto the surface of the at least one fertilizer granule. Contemplated agrochemicals include nitrification inhibitors, such as dicyanodiamide (DCD). When used by itself, DCD proved to be cohesive and when applied to a fertilizer, such as aluminum sulfate, the DCD powder rolled into discrete balls instead of spreading onto the aluminum sulfate. By adding a small amount of a powder, such as Zeolex 80, to the DCD powder, the dispersant combination adheres as a thin coating to the aluminum sulfate.

In addition, the dispersant must be blended such that the agrochemicals are held in place on the surface of the at least one granule. The dispersant and the at least one granule work together through their individual characteristics to hold the dispersants in place. For example, one of the features of the at least one fertilizer particle that works to hold the dispersants in place is the roughness or porosity of the surface of the fertilizer particle. Once the dispersant is applied to the at least one fertilizer granule, the fertilizer granule-dispersant particle is formed.

An overcoating material is then applied to the at least one fertilizer granule-dispersant particle to form the modified fertilizer particle. Contemplated overcoating materials are designed to—at least—seal or hold the dispersant into place on the fertilizer granule. Overcoating materials may also be designed to impart other properties to the final fertilizer granule, such as smoothness or roughness, color coding for blending with other fertilizer granules, time-lapse introduction to the fertilizer target, increased solvation with water after application to the fertilizer target, etc. Contemplated overcoating materials comprise standard wax-type dedust/anti-cake materials, which are designed to seal the dispersant material into place on the fertilizer granule.

Contemplated methods of producing a modified fertilizer material 100 comprise: a) providing at least one fertilizer granule 110, b) providing a dispersant that comprises at least one agrochemical blended with at least one powder 120, c) providing an overcoating material 130, d) applying the dispersant to the at least one fertilizer granule to form at least one fertilizer granule-dispersant particle 140, and e) applying the overcoating material to the at least one fertilizer granule-dispersant particle to form the modified fertilizer material 150, which is shown in FIG. 1.

The at least one fertilizer granule, the at least one agrochemical, the at least one powder, the at least one dispersant and/or the at least one overcoating material may be provided by any suitable method, including a) buying the at least one fertilizer granule, the at least one agrochemical, the at least one powder, the at least one dispersant and/or the at least one overcoating material precursor from a supplier; b) preparing or producing the at least one fertilizer granule, the at least one agrochemical, the at least one powder, the at least one dispersant and/or the at least one overcoating material in house using chemicals provided by another source and/or c) preparing or producing the at least one fertilizer granule, the at least one agrochemical, the at least one powder, the at least one dispersant and/or the at least one overcoating material in house using chemicals also produced or provided in house or at the location. It is contemplated that the at least one fertilizer granule, the at least one agrochemical, the at least one powder, the at least one dispersant and/or the at least one overcoating material are made of any suitable material or combination of materials, such as those materials already described herein.

Although some of the contemplated materials are in powder or wax form, it is contemplated that the materials disclosed herein may be dissolved in at least one solvent in order to formulate the particular compound, prepare the compound for the application, or impart additional chemical properties to the compound. For example, a solvent or solvents may be utilized to impart a rougher or porous surface to the fertilizer granules, in order to naturally hold more of the applied agrochemicals. Contemplated solvents include any suitable pure or mixture of organic molecules that are volatilized at a desired temperature, such as the critical temperature, or that can facilitate any of the above-mentioned design goals or needs. The solvent may also comprise any suitable pure or mixture of polar and non-polar compounds. As used herein, the term "pure" means that component that has a constant composition. For example, pure water is composed solely of $H_2O$. As used herein, the term "mixture" means that component that is not pure, including salt water. As used herein, the term "polar" means that characteristic of a molecule or compound that creates an unequal charge, partial charge or spontaneous charge distribution at one point of or along the molecule or compound. As used herein, the term "non-polar" means that characteristic of a molecule or compound that creates an equal charge, partial charge or spontaneous charge distribution at one point of or along the molecule or compound.

In some contemplated embodiments, the solvent or solvent mixture (comprising at least two solvents) comprises those solvents that are considered part of the hydrocarbon family of solvents. Hydrocarbon solvents are those solvents that comprise carbon and hydrogen. It should be understood that a majority of hydrocarbon solvents are non-polar; however, there are a few hydrocarbon solvents that could be considered polar. Hydrocarbon solvents are generally broken down into three classes: aliphatic, cyclic and aromatic. Aliphatic hydrocarbon solvents may comprise both straight-chain compounds and compounds that are branched and possibly crosslinked, however, aliphatic hydrocarbon solvents are not considered cyclic. Cyclic hydrocarbon solvents are those solvents that comprise at least three carbon atoms oriented in a ring structure with properties similar to aliphatic hydrocarbon solvents. Aromatic hydrocarbon solvents are those solvents that comprise generally three or more unsaturated bonds with a single ring or multiple rings attached by a common bond and/or multiple rings fused together. Contemplated hydrocarbon solvents include toluene, xylene, p-xylene, m-xylene, mesitylene, solvent naphtha H, solvent naphtha A, alkanes, such as pentane, hexane, isohexane, heptane, nonane, octane, dodecane, 2-methylbutane, hexadecane, tridecane, pentadecane, cyclopentane, 2,2,4-trimethylpentane, petroleum ethers halogenated hydrocarbons, such as chlorinated hydrocarbons, nitrated hydrocarbons, benzene, 1,2-dimethylbenzene, 2,4-trimethylbenzene, mineral spirits, kerosine, isobutylbenzene, methylnaphthalenes, ethyltoluene, ligroine. Particularly contemplated solvents include, but are not limited to, pentane, hexane, heptane, cyclohexane, benzene, toluene, xylene and mixtures or combinations thereof.

In other contemplated embodiments, the solvent or solvent mixture may comprise those solvents that are not considered part of the hydrocarbon solvent family of compounds, such as ketones, such as acetone, diethyl ketone, methyl ethyl ketone and the like, alcohols, esters, ethers and amines. In yet other contemplated embodiments, the solvent or solvent mixture may comprise a combination of any of the solvents mentioned herein.

In a contemplated example, an agrochemical, such as a nitrification inhibitor, is blended with about 10 weight percent of an amorphous sodium aluminum silicate (J. M. Huber Zeolex 80, for example). The resulting dispersant is applied to ammonium sulfate in a suitable mixing device. Once the powder mixture has spread evenly over the ammonium sulfate, a standard wax type dedust/anti-cake is applied to seal the product into place.

EXAMPLE

A DCD/Zeolex mixture was prepared that comprised 90 weight percent DCD and 10 weight percent of Zeolex 80. The dry mixture was then applied to about 50 pounds of ammonium sulfate in a drum blender. The mixture was allowed to spread and adhere to the surface. A molten wax/oil based dedusting agent (as typically used on fertilizers and readily available from suppliers like ArrMaz Custom Chemicals) was then applied to the surface-coated fertilizer and allowed to spread and solidify on to the coated ammonium sulfate. A set of similar mixtures were prepared according to Table 1.

TABLE 1

| DCD Nitrogen | Ammonium Sulfate | DCD | Zeolex 80 | DeDust Coating |
|---|---|---|---|---|
| 5% | 50 lbs | 381 g | 42.3 g | 225 g |
| 7% | 50 lbs | 544 g | 60.4 g | 225 g |
| 10% | 50 lbs | 803 g | 89.2 g | 225 g |

Thus, specific embodiments and applications of chemically and physically modified fertilizers and their methods of production have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A modified fertilizer material, comprising:
    a dispersant comprising at least one agrochemical blended with at least one powder, the at least one agrochemical including nitrification inhibitors that comprise dicyanodiamide,
    at least one fertilizer granule coated with the dispersant to form at least one fertilizer granule-dispersant particle, and
    an overcoating material that is applied to the at least one fertilizer granule-dispersant particle to form the modified fertilizer material.

2. The modified fertilizer material of claim 1, wherein the at least one fertilizer granule comprises a nitrogen-based fertilizer, a potassium-based fertilizer, a phosphorus-based fertilizer or a combination thereof.

3. The modified fertilizer material of claim 1, wherein the at least one fertilizer granule comprises an ammonium fertilizer, a urea fertilizer or a combination thereof.

4. The modified fertilizer material of claim 3, wherein the ammonium fertilizer comprises ammonium sulfate.

5. The modified fertilizer material of claim 1, wherein the at least one powder material comprises amorphous sodium aluminum silicate.

6. The modified fertilizer material of claim 1, wherein the overcoating material comprises a wax-type dedust/anti-cake material.

7. The modified fertilizer material of claim 1, wherein the dispersant is a dry mixture of the agrochemical and the powder that is adapted to disperse and spread the agrochemical onto the fertilizer granule.

8. A method of producing a modified fertilizer materials, comprising:
    providing at least one fertilizer granule,
    providing a dispersant that comprises at least one agrochemical blended with at least one powder, the at least one agrochemical including nitrification inhibitors that comprise dicyanodiamide,
    providing an overcoating material,
    applying the dispersant to the at least one fertilizer granule to form at least one fertilizer granule-dispersant particle, and
    applying the overcoating material to the at least one fertilizer granule-dispersant particle to form the modified fertilizer material.

9. The method of claim 8, wherein the at least one fertilizer granule comprises a nitrogen-based fertilizer, a potassium-based fertilizer, a phosphorus-based fertilizer or a combination thereof.

10. The method of claim 8, wherein the at least one fertilizer granule comprises an ammonium fertilizer, a urea fertilizer or a combination thereof.

11. The method of claim 10, wherein the ammonium fertilizer comprises ammonium sulfate.

12. The method of claim 8, wherein the at least one powder material comprises amorphous sodium aluminum silicate.

13. The method of claim 8 wherein the overcoating material comprises a wax-type dedust/anti-cake material.

14. The method of claim 8, wherein the dispersant is a dry mixture of the agrochemical and the powder that is adapted to disperse and spread the agrochemical onto the fertilizer granule.

\* \* \* \* \*